(12) United States Patent
Nelson

(10) Patent No.: US 11,460,222 B1
(45) Date of Patent: Oct. 4, 2022

(54) AUTOMATIC HYGIENIC HOT WATER EXPEDITER DEVICE

(71) Applicant: Chris Lee Nelson, North East, PA (US)

(72) Inventor: Chris Lee Nelson, North East, PA (US)

(*) Notice: Subject to any disclaimer, the term of this patent is extended or adjusted under 35 U.S.C. 154(b) by 221 days.

(21) Appl. No.: 16/849,769

(22) Filed: Apr. 15, 2020

Related U.S. Application Data

(60) Provisional application No. 62/833,975, filed on Apr. 15, 2019.

(51) Int. Cl.
| | |
|---|---|
| F24H 9/20 | (2022.01) |
| F24H 1/10 | (2022.01) |
| G05D 23/13 | (2006.01) |
| E03C 1/02 | (2006.01) |
| E03B 7/04 | (2006.01) |
| E03C 1/01 | (2006.01) |
| E03B 7/07 | (2006.01) |

(52) U.S. Cl.
CPC ............. *F24H 9/2007* (2013.01); *E03B 7/04* (2013.01); *E03B 7/078* (2013.01); *E03C 1/01* (2013.01); *E03C 1/02* (2013.01); *F24H 1/10* (2013.01); *G05D 23/132* (2013.01)

(58) Field of Classification Search
CPC .......... F24H 9/2007; E03B 7/04; E03B 7/045; E03B 7/078; E03B 7/08; E03B 1/048; E03C 1/00; E03C 1/01; E03C 1/02; E03C 1/023; E03C 1/04; E03C 2201/30; F24D 17/00

USPC .......................................................... 137/563
See application file for complete search history.

(56) References Cited

U.S. PATENT DOCUMENTS

| | | | | |
|---|---|---|---|---|
| 4,924,536 | A | * | 5/1990 | Houghton ................. E03B 1/04 4/415 |
| 5,524,666 | A | * | 6/1996 | Linn ......................... E03B 1/04 122/13.3 |
| 6,032,687 | A | | 3/2000 | Linn |
| 6,997,200 | B2 | | 2/2006 | King |
| 9,879,410 | B2 | | 1/2018 | Yeh |
| 2006/0130918 | A1 | | 6/2006 | Kisling |
| 2009/0288720 | A1 | | 11/2009 | Krausse |

FOREIGN PATENT DOCUMENTS

| | | | | |
|---|---|---|---|---|
| GB | 2489120 A | * | 9/2012 | ............. E03B 7/045 |
| SE | 538879 C2 | * | 9/2016 | ............... E03C 1/10 |

* cited by examiner

*Primary Examiner* — Edelmira Bosques
*Assistant Examiner* — Michael James Giordano
(74) *Attorney, Agent, or Firm* — The Law Office of Patrick F. O'Reilly III, LLC

(57) ABSTRACT

An automatic hygienic hot water expediter device for the hastening of the delivery of warm/hot water to a spigot for purposes of hygiene and comfort. The automatic hygienic hot water expediter device generally includes a controller, tubing or piping composed of code-appropriate materials, and flow control components.

12 Claims, 8 Drawing Sheets ated comfortable. Temperatures below 68° F. and above 120° F. were judged as too cold and too hot, respectively.

AUTOMATIC HYGIENIC HOT WATER EXPEDITER DEVICE

CROSS-REFERENCE TO RELATED APPLICATIONS

This patent application claims priority to, and incorporates by reference in its entirety, U.S. Provisional Patent Application No. 62/833,975, entitled "Automatic Hygienic Hot Water Expediter Device", filed on Apr. 15, 2019.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a plumbing device, which hastens the delivery of water of hygienic temperatures to a spigot, or other fixture, for the purpose of hygienic cleansing, with the additional benefit, depending upon the application, of increased comfort for the consumer.

2. Background

The term "hygienic" is defined as that which is conducive to good health; healthful; sanitary. The term "hygiene" describes a condition or practice conducive to the preservation of health, as cleanliness.

According to the Centers for Disease Control and Prevention, washing with soap and water is the gold standard for hand hygiene. It is an undisputed fact that warmed water is more comfortable than cold. If water is perceived as uncomfortably cold for the individual washing his or her hands, the exercise may be inappropriately truncated, incomplete, or possibly not undertaken beyond initial testing of the water temperature. Cold water also prevents soap from lathering properly so that soil and germs may not be as effectively washed away. According to one recent study, water temperatures ranging from 95 to 113° F. were gener- The spread of many bacteria and viruses is minimized by proper vigorous hand washing techniques. In the news of late is coronavirus, but there are many bacteria that have been in the public spotlight as well, including infectious outbreaks resulting from coliform organisms such as *E. coli* and *salmonella*.

Similarly virulent is methicillin-resistant *Staphylococcus aureus* (MRSA), which tends to colonize nasal passages and is often spread by coughing, sneezing, touching, or blowing one's nose. Schools and other public places are breeding grounds for this particular organism.

Hygienic hand washing requires temperatures of at least 95-100° F. The temperature of water standing in any pipe within a building tends to assume ambient temperature with time, which would be approximately 70° F. under most circumstances.

How often has the average individual, including the examiner of this application, utilized a commode in the middle of the night and then stepped to the sink for hand washing, only to be subjected to cold water? This may be the usual scenario worldwide.

How often has the average individual, including the examiner of this application, utilized a restroom in a public restaurant, and upon stepping to the sink for hand washing, been subjected to the flow of cold water from the spigot? A significant point to contemplate is this is the same sink those involved with the preparation of your food are likely employing after their use of the commode. This is of concern with regard to public health, contamination of food, and minimization of the spread of infectious disease.

The year is 2020, not 1720. Facilitation of hygienic hand washing, as well as the provision of water of appropriate temperatures for maximal hygienic purposes and consumer comfort, should have advanced further by this time.

The issue at hand is how to provide for hygienic hand washing and purposes of general cleansing in a convenient and economical way while taking advantage of hot water availability within the already existing hot water heating system of the building, without expensive and/or cumbersome in-line hot water heaters or mixing valves (which mix water in the hot and cold water lines; a dubious practice possibly making water unsuitable for consumption)?

Many, if not most, consumers will not stand for an indeterminate time at a spigot waiting for hot water to eventually emerge in order to accomplish hygienic hand washing. At best, many will either wash with water of less than hygienic temperatures, or not wash at all because of cold water-induced discomfort. Common sense dictates a consumer will tend to spend more time with, and more thoroughly accomplish the task of, hand washing if the temperature of the water is in a comfortable range.

More problematic for those attempting to obtain hygienic hand cleansing within a public restroom involves sinks controlled by infrared sensors, which briefly turn on and then, shortly thereafter, turn off the stream of water, which is generally of ambient temperatures.

Therefore, what is needed is a device that expedites the delivery of water of hygienic temperatures to the spigot or fixture of choice, from the central hot water heating system of the building or facility, while monitoring and prioritizing water temperatures for reasons of public health, and simultaneously minimizing waste and/or redirecting water that would otherwise be sent down a drain. Moreover, there is a need for a device that repurposes water instead of wasting as a first priority as the device functions to maintain water of appropriate hygienic temperatures in the vicinity of the fixture of choice. Furthermore, there is a need for a device that redirects water down the drain as necessary in order to provide appropriate hygienic conditions to minimize chances for the spread of infectious disease and also to provide comfort to the consumer.

BRIEF SUMMARY OF EMBODIMENTS OF THE INVENTION

Accordingly, the present invention is directed to an automatic hygienic hot water expediter device that substantially obviates one or more problems resulting from the limitations and deficiencies of the related art.

In accordance with one or more embodiments of the present invention, there is provided an automatic hygienic hot water expediter device that includes an afferent hot water conduit comprising an afferent hot water conduit temperature sensor disposed therein, the afferent hot water conduit temperature sensor configured to sense a temperature of hot water in the afferent hot water conduit; an afferent cold water conduit comprising an afferent cold water conduit temperature sensor disposed therein, the afferent cold water conduit temperature sensor configured to sense a temperature of cold water in the afferent cold water conduit; an efferent hot water conduit fluidly coupled to the afferent hot water conduit, the efferent hot water conduit configured to supply hot water to one or more plumbing fixtures; a first efferent cold water conduit fluidly coupled to the afferent cold water conduit, the first efferent cold water conduit configured to supply cold water to the one or more plumbing fixtures; a second efferent cold water conduit fluidly coupled to the afferent cold water conduit, the second efferent cold water conduit configured to supply cold water to one or more other plumbing fixtures or a drain line; a hot water expediter conduit fluidly coupling the afferent hot water conduit to the afferent cold water conduit; a hot water control valve disposed in the hot water expediter conduit, the hot water control valve configured to regulate flow through the hot water expediter conduit; a cold water control valve disposed in the afferent cold water conduit downstream of the first efferent cold water conduit and upstream of the second efferent cold water conduit, the cold water control valve configured to regulate a flow of cold water into the second efferent cold water conduit; and a controller operatively coupled to the afferent hot water conduit temperature sensor, the afferent cold water conduit temperature sensor, the hot water control valve, and the cold water control valve, the controller being programmed to operate in at least a first control mode. When operating in the first control mode, and upon the controller receiving sensor output data from the afferent hot water conduit temperature sensor and the afferent cold water conduit temperature sensor indicating that the hot water temperature in the afferent hot water conduit is less than, or substantially equal (e.g., within plus or minus 1 degree Fahrenheit) to the cold water temperature in the afferent cold water conduit, the controller is configured to open the hot water control valve and close the cold water control valve so that water from the hot water expediter conduit flows into the second efferent cold water conduit. And, when operating in the first control mode, and upon the controller receiving sensor output data from the afferent hot water conduit temperature sensor and the afferent cold water conduit temperature sensor indicating that the hot water temperature in the afferent hot water conduit is greater than the cold water temperature in the afferent cold water conduit, the controller is configured to close the hot water control valve and open the cold water control valve so that water from the afferent cold water conduit flows into the second efferent cold water conduit, rather than the water from the hot water expediter conduit flowing into the second efferent cold water conduit.

In a further embodiment of the present invention, the device further comprises a first check valve disposed in the hot water expediter conduit, the first check valve configured to restrict water flow to a single flow direction from the afferent hot water conduit to the afferent cold water conduit.

In yet a further embodiment, the device further comprises a second check valve disposed in the second efferent cold water conduit, the second check valve configured to restrict water flow to a single flow direction from the afferent cold water conduit or the hot water expediter conduit to the second efferent cold water conduit.

In still a further embodiment, the one or more plumbing fixtures supplied by the efferent hot water conduit and the first efferent cold water conduit are selected from the group consisting of: (i) a sink, (ii) a bathtub, and (iii) shower, and (iv) combinations thereof.

In yet a further embodiment, the one or more other plumbing fixtures supplied by the second efferent cold water conduit include a toilet.

In still a further embodiment, at least one of the controller, the afferent hot water conduit temperature sensor, the afferent cold water conduit temperature sensor, the hot water control valve, and the cold water control valve is disposed inside a housing.

In accordance with one or more other embodiments of the present invention, there is provided an automatic hygienic hot water expediter device that includes an afferent hot water conduit comprising an afferent hot water conduit temperature sensor disposed therein, the afferent hot water conduit temperature sensor configured to sense a temperature of hot water in the afferent hot water conduit; a cold water conduit comprising a cold water conduit temperature sensor disposed therein, the cold water conduit configured to supply cold water to one or more plumbing fixtures, the cold water conduit temperature sensor configured to sense a temperature of cold water in the cold water conduit; an efferent hot water conduit fluidly coupled to the afferent hot water conduit, the efferent hot water conduit configured to supply hot water to the one or more plumbing fixtures; a hot water expediter conduit fluidly coupling the afferent hot water conduit to a drain line; a hot water control valve disposed in the hot water expediter conduit, the hot water control valve configured to regulate flow through the hot water expediter conduit; and a controller operatively coupled to the afferent hot water conduit temperature sensor, the cold water conduit temperature sensor, and the hot water control valve, the controller being programmed to operate in at least a first control mode. When operating in the first control mode, and upon the controller receiving sensor output data from the afferent hot water conduit temperature sensor and the cold water conduit temperature sensor indicating that a predetermined temperature differential does not exist between the hot water in the afferent hot water conduit and the cold water in the cold water conduit, the controller is configured to open the hot water control valve so that water from the hot water expediter conduit flows into the drain line. And, when operating in the first control mode, and upon the controller receiving sensor output data from the afferent hot water conduit temperature sensor and the cold water conduit temperature sensor indicating that a predetermined temperature differential does exist between the hot water in the afferent hot water conduit and the cold water in the cold water conduit, the controller is configured to close the hot water control valve so that water from the hot water expediter conduit is not able to flow into the drain line.

In a further embodiment of the present invention, the one or more plumbing fixtures supplied by the efferent hot water conduit include a scrub sink.

In yet a further embodiment, the device further comprises an activation button or activation switch operatively coupled to the controller; and upon a user depressing the activation button or activation switch, the controller is configured to initiate a comparison of the hot water temperature sensed by the afferent hot water conduit temperature sensor in the afferent hot water conduit to the cold water temperature sensed by the cold water conduit temperature sensor in the cold water conduit.

In still a further embodiment, the device further comprises an indicator light operatively coupled to the controller, the indicator light configured to indicate an availability of hygienically warm water in the afferent hot water conduit.

In accordance with yet one or more other embodiments of the present invention, there is provided an automatic hygienic hot water expediter device that includes an afferent hot water conduit comprising an afferent hot water conduit temperature sensor disposed therein, the afferent hot water conduit temperature sensor configured to sense a temperature of hot water in the afferent hot water conduit; an afferent cold water conduit comprising an afferent cold water conduit temperature sensor disposed therein, the afferent cold water conduit temperature sensor configured to sense a temperature of cold water in the afferent cold water conduit; an efferent hot water conduit fluidly coupled to the afferent hot water conduit, the efferent hot water conduit configured to supply hot water to one or more plumbing fixtures; a first efferent cold water conduit fluidly coupled to the afferent cold water conduit, the first efferent cold water conduit configured to supply cold water to the one or more plumbing fixtures; a second efferent cold water conduit fluidly coupled to the afferent cold water conduit, the second efferent cold water conduit configured to supply water to a drain line; a hot water expediter conduit fluidly coupling the afferent hot water conduit to the afferent cold water conduit; a hot water control valve disposed in the hot water expediter conduit, the hot water control valve configured to regulate flow through the hot water expediter conduit; a cold water control valve disposed in the afferent cold water conduit, the cold water control valve configured to regulate a flow of the water into the second efferent cold water conduit; a drain line control valve disposed in the second efferent cold water conduit, the drain line control valve configured to regulate a flow of the water into the drain line; and a controller operatively coupled to the afferent hot water conduit temperature sensor, the afferent cold water conduit temperature sensor, the hot water control valve, the cold water control valve, and the drain line control valve, the controller being programmed to operate in at least a first control mode. When operating in the first control mode, and upon the controller receiving sensor output data from the afferent hot water conduit temperature sensor and the afferent cold water conduit temperature sensor indicating that a predetermined temperature differential does exist between the hot water in the afferent hot water conduit and the cold water in the afferent cold water conduit, the controller is configured to close the hot water control valve, open the cold water control valve, and close the drain line control valve so that water from the hot water expediter conduit does not flow into the drain line. And, when operating in the first control mode, and upon the controller receiving sensor output data from the afferent hot water conduit temperature sensor and the afferent cold water conduit temperature sensor indicating that a predetermined temperature differential does not exist between the hot water in the afferent hot water conduit and the cold water in the afferent cold water conduit, the controller is configured to open the hot water control valve, close the cold water control valve, and open the drain line control valve so that water from the hot water expediter conduit does flow into the drain line.

In a further embodiment of the present invention, the one or more plumbing fixtures supplied by the efferent hot water conduit and the first efferent cold water conduit are selected from the group consisting of: (i) a sink, (ii) a toilet, and (iii) a urinal, and (iv) combinations thereof.

In yet a further embodiment, the device further comprises a first check valve disposed in the hot water expediter conduit, the first check valve configured to restrict water flow to a single flow direction from the afferent hot water conduit to the afferent cold water conduit.

In still a further embodiment, the device further comprises a second check valve disposed in the first efferent cold water conduit, the second check valve configured to restrict water flow to a single flow direction from the afferent cold water conduit to the one or more plumbing fixtures.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
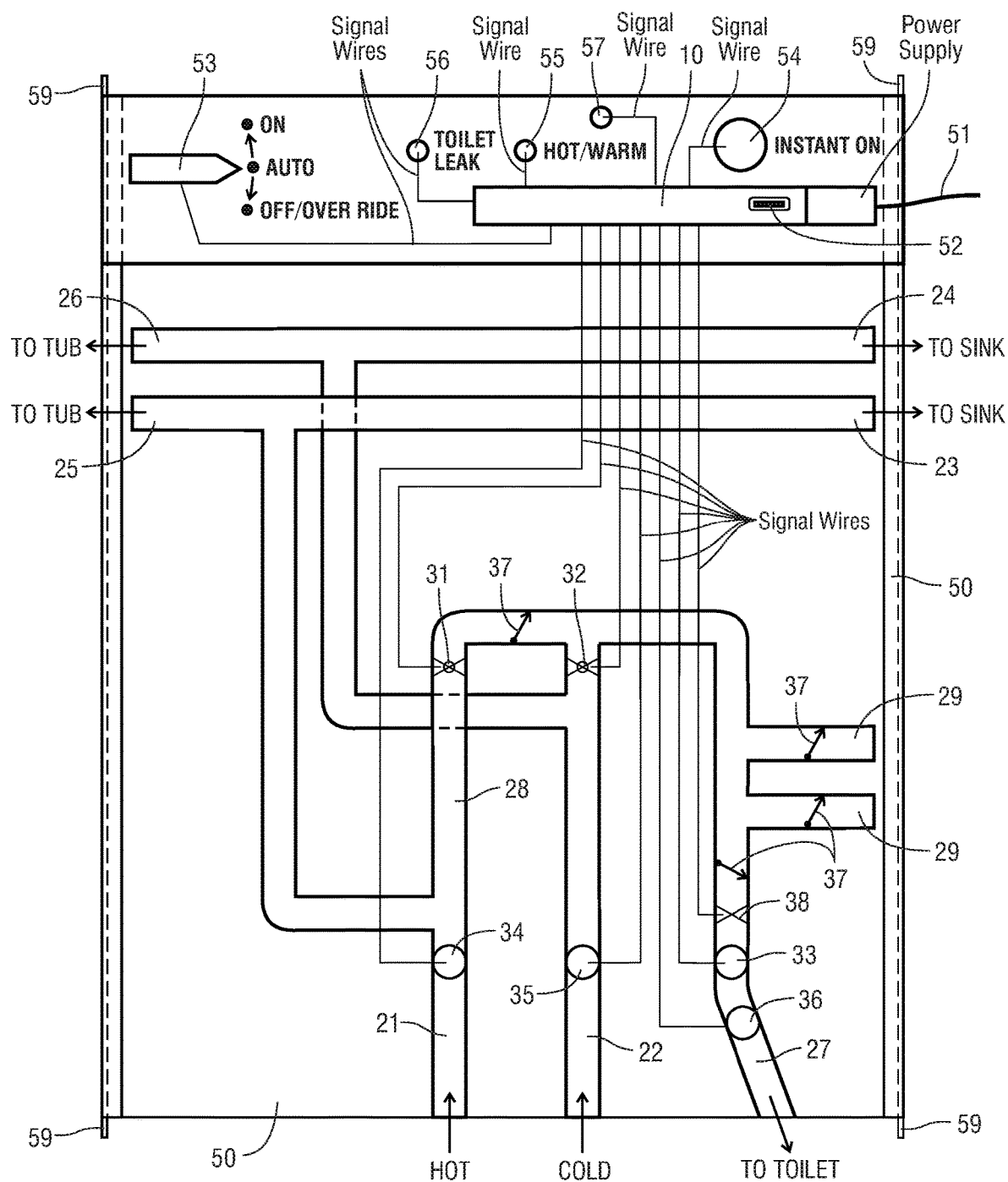
FIG. 1 is a schematic front view of an automatic hygienic hot water expediter device, according to one illustrative embodiment of the invention.

As described in the illustrative embodiments hereinafter, the automatic hygienic hot water expediter device generally relates to a hot water device, which includes a logic circuit, tubing or piping composed of code-appropriate materials, and flow control components.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining one or more illustrative embodiments of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description, and should not be regarded as limiting. Prior to describing the illustrative embodiments, various objects of the present automatic hygienic hot water expediter device will be described.

An object is to provide an automatic hygienic hot water expediter device, which mitigates against non-hygienic cold water hand washing after a toilet flush or as a result of variable downstream ambient or cold water consumption by other devices or fixtures.

Another object is to provide an automatic hygienic hot water expediter device for the hastening of the delivery of warm water to a spigot for purposes of hygiene and comfort.

Another object is to provide an automatic hygienic hot water expediter device that is an electronically-controlled automatic plumbing component.

Another object is to provide an automatic hygienic hot water expediter device that provides for the delivery of hot water to the vicinity of a sink after a nearby toilet is flushed, or various other downstream cold or ambient temperature water-dependent spigots, devices or fixtures are functional.

Another object is to provide an automatic hygienic hot water expediter device that redirects otherwise wasted potable water from a hot water line.

Another object is to provide an automatic hygienic hot water expediter device that automatically monitors water for hygienic temperatures.

Another object is to provide an automatic hygienic hot water expediter device that electronically detects and alerts the consumer of toilet float/flush system leaks.

Another object is to provide an automatic hygienic hot water expediter device capable of serving multiple local plumbing systems simultaneously.

Another object is to provide an automatic hygienic hot water expediter device that allows for otherwise normal flow of potable water within a local plumbing system.

Another object is to provide an automatic hygienic hot water expediter device that electronically monitors water flow to a toilet.

Another on object is to provide an automatic hygienic hot water expediter device that electronically analyzes water and temperature differentials.

Another object is to provide an automatic hygienic hot water expediter device that requires no action on the part of the consumer in order to function.

Another object is to provide an automatic hygienic hot water expediter device that indicates and/or signals hot water availability.

Another object is to provide an automatic hygienic hot water expediter device that indicates detection of a leak.

Another object is to provide an automatic hygienic hot water expediter device that may be a stand-alone component through which fixtures requiring hot and cold water may be plumbed.

Another object is to provide an automatic hygienic hot water expediter device that can be broken down into various components and placed remotely where convenient within the plumbing system of a building.

Another object is to provide an automatic hygienic hot water expediter device that automatically compensates for variable hot water usage elsewhere in the building.

Another object is to provide an automatic hygienic hot water expediter device that does not interfere with plumbing system function during a power failure.

Another object is to provide an automatic hygienic hot water expediter device that maximizes efficient potable hot water usage.

Another object is to provide an automatic hygienic hot water expediter device that requires no secondary heating source to decrease time of delivery of hot water to a spigot.

Another object is to provide an automatic hygienic hot water expediter device that automatically compensates for water usage elsewhere in the building.

Another object is to provide an automatic hygienic hot water expediter device which functions regardless of the rate or volume of water flow.

Another object is to provide an automatic hygienic hot water expediter device that does not require any secondary holding or storage tank.

Another object is to provide an automatic hygienic hot water expediter device that automatically summons heated water to the proximity of the spigot of choice, making it available to the consumer, while minimizing no unnecessary waste, and without any required action on the part of the consumer.

Another object is to provide an automatic hygienic hot water expediter device that promotes and facilitates hygienic hand washing and thereby decreases the potential for spread of infectious disease.

Another object is to provide an automatic hygienic hot water expediter device that promotes and facilitates hygienic hand washing and thereby decreases the potential for food contamination within kitchens and restaurants thusly diminishing the potential for the spread of infectious disease.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

Turning now descriptively to the drawings of the illustrative embodiments, in which similar reference characters denote similar elements throughout the views, the figures generally illustrate a logic circuit, tubing or piping composed of code-appropriate materials, and flow control components.

1. Configuration and Functionality of Illustrative Embodiments

FIG. 1 depicts a front view of one illustrative embodiment of the automatic hygienic hot water expediter device. As shown in this figure, the external housing 50, to which are attached mounting flanges 59, accommodates external connectors for afferent hot water and afferent cold water and variably encloses afferent hot water conduit 21 and afferent cold water conduit 22 through accommodation for afferent water conduit and connectors. Also located on, without or within the external housing 50 are the electrical hook-up for AC power to unit 51, electrical connector for any remote control switch or sensor 52 (which is connected to sub-circuit for external control switching), a control switch 53 (which is connected to sub-circuit for control switch reset and instant on button/sensor), instant on button 54, hot/warm water sensor indicator light 55 (which is connected to sub-circuit for warm/hot water indicator light), toilet leak detector indicator light 56 and infrared sensor 57. Attached to afferent hot water conduit 21 and afferent cold water conduit 22 are afferent hot water conduit temperature sensor 34 and afferent cold water temperature sensor 35, (which are connected to sub-circuit for hot water temperature sensor and sub-circuit for cold water temperature sensor, respectively, and are components of logic circuit 10), which are parts of the flow control components mechanism. The efferent hot water conduit to sink 23, efferent hot water conduit to bathtub/shower 25, and hot water expediter conduit from the afferent hot water line to the afferent cold water line 28 are found just distal to, and continuous with, the afferent hot water conduit 21. Distal to afferent cold water conduit 22 are efferent cold water conduit to sink 24 and efferent cold water conduit to bathtub/shower 26. Within the shunt conduit from the afferent hot water line to the afferent cold water line 28 is hot water conduit valve 31 (which is connected to sub-circuit for hot water control valve within logic circuit) and also check valve 37. Proximal to the junction of afferent cold water conduit 22 with shunt from the afferent hot water line to the afferent cold water line 28 and distal to the efferent cold water conduit to sink 24 and efferent cold water conduit to bathtub/shower 26 is located cold water conduit valve 32 (which is connected to sub-circuit for cold water control valve). Distal to the junction of shunt conduit from the afferent hot water line to the afferent cold water line 28 and the afferent cold water conduit 22 is the efferent conduit to toilet 27, along which are found the flow detector on efferent conduit 33 (which is connected to sub-circuit for toilet leak detector sensor and light), efferent conduit temperature sensor 36 (which is connected to sub-circuit for efferent water temperature sensor), and a variable number of auxiliary efferent conduits 29. Each of the various efferent conduits 27 and 29 is fitted with a check valve 37.

In the illustrative embodiment, around the perimeter of external housing 50 are located external connectors for efferent hot water to bathtub/shower, efferent cold water to bath tub/shower, efferent hot water to sink, efferent cold water to sink and efferent water to toilet, all of which are made accessible by accommodation for efferent water conduits and connectors.

Figure 3:
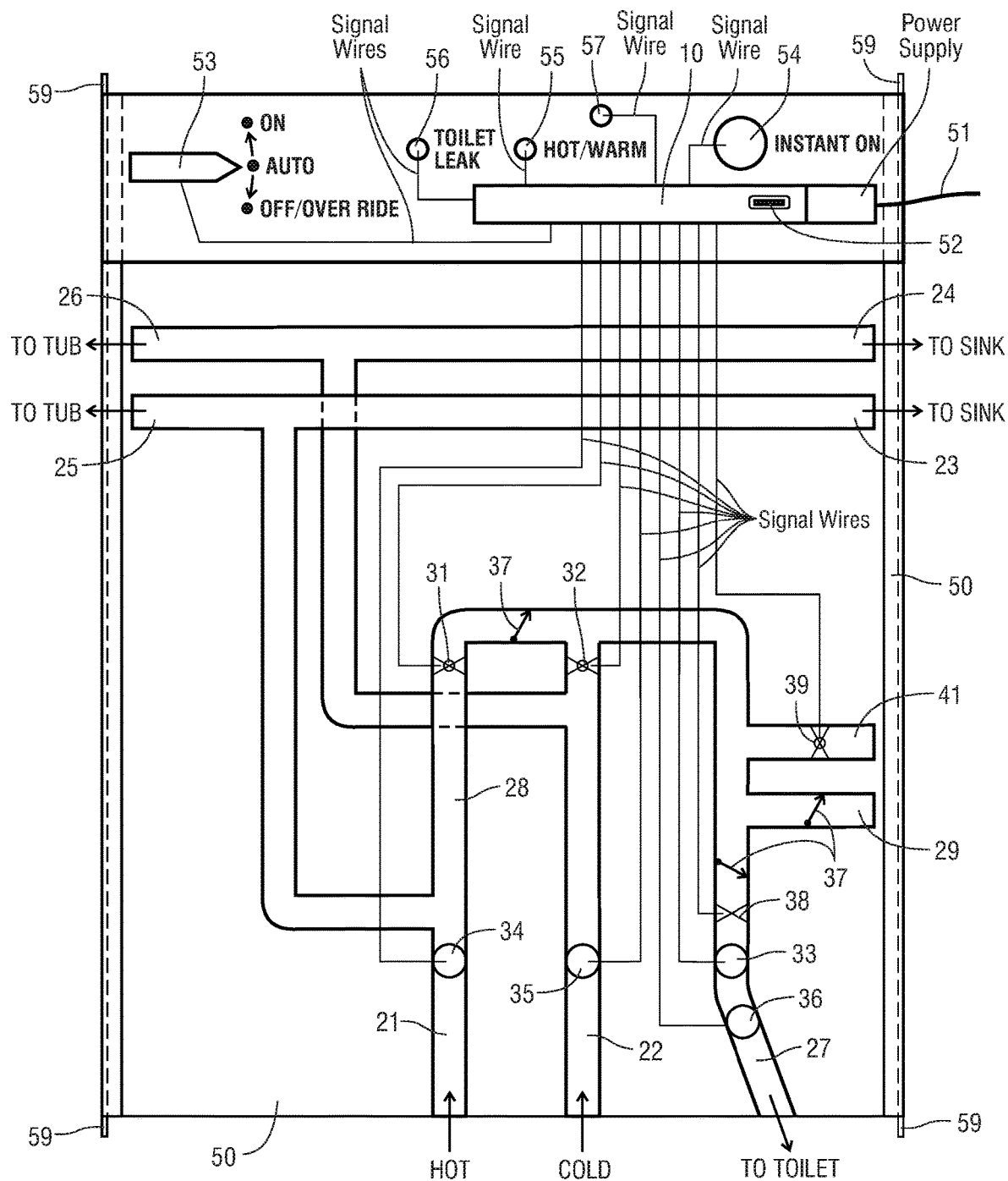
FIG. 3 is a schematic front view of another automatic hygienic hot water expediter device similar to that depicted in FIG. 1, except that one of the auxiliary efferent conduits with an associated check valve has been removed and replaced by an expediter conduit to drain with an associated expediter valve, according to another illustrative embodiment of the invention.

Another illustrative embodiment of the automatic hygienic hot water expediter device is illustrated in FIG. 3. The illustrative embodiment of FIG. 3 is similar to that of the embodiment in FIG. 1 with the exception that, for purposes of illustration, one of the auxiliary efferent conduits 29 with associated check valve 37 have been removed and replaced by expediter conduit to drain 41 with associated expediter valve 39.

Figure 2:
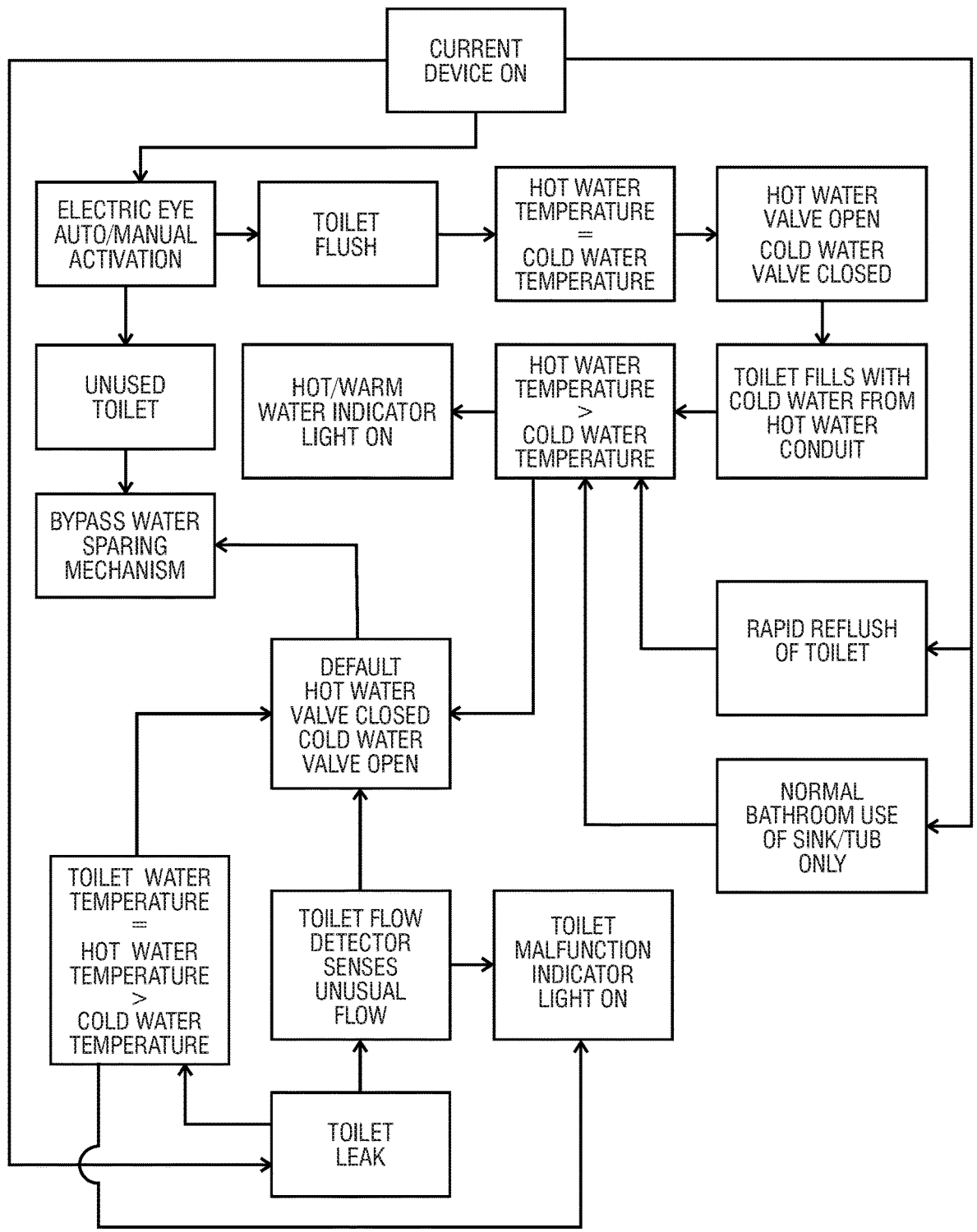
FIG. 2 is a block diagram illustrating certain aspects of the functionality of the illustrative embodiments of the automatic hygienic hot water expediter device described herein.

In FIG. 2, a block diagram illustrating certain aspects of the functionality of the illustrative embodiments is presented. Although not comprehensive, various possible interactions and modes of operation between components are illustrated in FIG. 2. The functional features of the illustrative embodiments will be described in more detail hereinafter.

Usual operation of the hot water expediter device involves, but is not limited to, activation of the system via sensor or other automatic device, or manual activation. After a period of plumbing inactivity, toilet flush occurs simultaneously with the sensing of the temperature within the afferent hot and cold water conduits. If the temperatures are equal, the hot water valve is opened and the cold water valve is closed. The toilet then fills, or is initially filled, with water, which is at ambient temperature. When the afferent hot water sensor registers a temperature considered significantly higher than the cold water sensor is measuring (e.g., 20 to 30° F. higher), the hot water valve closes and the cold water valve opens to finish filling the toilet tank as required. Also, a signal is sent to activate the hot/warm water indicator light in order to alert the consumer as to the availability of hot water for use in other fixtures.

While the system is on, if the toilet is unused, the hot water expediter portion of the current device is bypassed, and hot and cold water flow to various bathroom fixtures is in unaffected fashion. However, with the expediter conduit to drain and associated expediter valve in place, as illustrated in FIG. 3, once the consumer is detected by the infrared sensor, the expediter valve moves from the default closed position to the open position thereby shunting water down the drain until water of hygienic temperatures is summoned to the vicinity of the sink, at which time the valve returns to the default closed position. This particular embodiment, with this mode of action, would be particularly suitable for a small restaurant with multiple bathrooms in the same vicinity allowing one device to service all plumbing fixtures.

With the system activated, if there is a rapid re-flushing of the toilet, and warm/hot water has already reached the afferent hot water conduit sensor, the hot water conduit valve will be closed and the cold water conduit valve will be open, which is default position for each. This would also be the result if hot water demands were made at other fixtures within the bathroom in the absence of a toilet flush.

Another scenario illustrative of the capacity of the current device involves toilet malfunction such as a leak. Flow detector on the efferent conduit to toilet senses unusual flow and afferent hot water conduit temperature sensor measures a significantly higher temperature than afferent cold water conduit temperature sensor, through various sub-circuits, which causes default closure of the hot water conduit valve and opening or closing of cold water conduit valve and actuation of toilet leak detector indicator light.

2. Controller With Logic Circuit

The controller with a logic circuit is of variable electronic composition based upon application and use. It is variably designed to accommodate and control various sensors, indicator lights, switches, and valves to enable overall function of the current device.

The controller with the logic circuit 10 is fabricated from various electronic devices such as transistors, capacitors, resistors, and other components of modern circuitry as the manufacturer of the current device requires. The circuit allows, for example, various electronic yes or no functions, which then orchestrate the function and interaction between the various sub-circuits and component parts of the current device.

Determining the functional status of the logic circuit 10 are sub-circuits for the control switch and instant on button/sensor and/or the sub-circuit for external control switching. Basic to the function of the illustrative embodiments are the sub-circuits for the hot water control valve, cold water control valve and hot water temperature sensor to interpret the signals sent by the afferent hot water conduit temperature sensor 34 which determines whether the hot water conduit valve 31 is open and cold water conduit valve 32 is closed, or vice versa. To further increase efficient use of the illustrative embodiments, sub-circuit for warm/hot water indicator light indicates via hot/warm indicator light 55 on external housing 50 the availability of warm/hot water use; sub-circuit for toilet leak detector sensor and light alerts consumer of possible toilet leak by analyzing signals from efferent toilet conduit temperature sensor 36 and/or flow detector on efferent conduit to toilet 33 in conjunction with returning system to default status by closing hot water conduit valve 31 and opening cold water conduit valve 32; sub-circuit for cold water temperature sensor is a back-up for proper function of the system and leak detection by comparing the temperature differentials between afferent hot water conduit 21 and afferent cold water conduit 22 as monitored by afferent hot water conduit temperature sensor 34 and afferent cold water temperature sensor 35, respectively, and efferent toilet conduit temperature sensor 36; sub-circuit for efferent toilet water temperature sensor, for example, compares the difference in temperature between the efferent conduit to toilet 27 and the afferent hot water conduit 21 and afferent cold water conduit 22 to assist in function of the current device to open or close hot water conduit valve 31 and alternately, synchronously and opposingly, close or open cold water conduit valve 32 if in the former instance the temperature within the afferent hot water conduit 21 and afferent cold water conduit 22 as well as the efferent conduit to toilet 27 are approximately equal, or in the latter instance where the temperature within the afferent hot water conduit 21 and efferent conduit to toilet 27 are equal to each other and significantly greater than the temperature of the afferent cold water conduit 22. Overall function and interaction of components is variable depending upon any additional or variable integration of components.

3. Internal Tubing/Piping

In the illustrative embodiments, internal tubing/piping allow for the flow of water into (afferent) and out of (efferent) the current device, as well as between various sub-elements.

For example, as shown in FIG. 1, internal tubing/piping is comprised of the afferent hot water conduit 21 which leads to a junction which ultimately gives rise to the efferent hot water conduit to the sink 23 and the efferent hot water conduit to the bathtub/shower 25, or alternately to the shunt conduit 28 from the afferent hot water conduit 21 to the afferent cold water conduit 22 leading ultimately to the auxiliary efferent conduits 29 and the efferent conduit to toilet 27. The afferent cold water conduit 22 gives rise to the efferent cold water conduit to the sink 24 and the efferent cold water conduit to bathtub/shower 26, or alternately joins with the hot water expediter conduit 28 which again gives rise to the auxiliary efferent conduits 29 and efferent conduit to the toilet 27.

In the illustrative embodiments, the conduits may be of variable size and disposition, be expanded in terms of interconnections, and vary in terms of configuration depending upon application and component plumbing fixtures based upon specific needs and context.

4. Flow Control Components

In the illustrative embodiments, flow control is accomplished by the orchestrated function of valve and sensor components variably positioned along the internal tubing/piping.

Flow control components permit, ultimately, for the physical direction in which water flows within and without the current device. Referring to the illustrative embodiment of FIG. 1, the hot water conduit valve 31 (which in the illustrative embodiment would be a normally closed solenoid valve), through interaction with various components of logic circuit 10 will either allow for the flow of water into hot water expediter conduit 28 if open, or if closed (default) into efferent hot water conduit to sink 23 and/or efferent hot water conduit to bathtub/shower 25. Cold water conduit valve 32 (which in the illustrative embodiment would be a normally open solenoid valve), will allow for flow of water into efferent cold water conduit to sink 24, efferent cold water conduit to bathtub/shower 26, efferent conduit to toilet 27, and auxiliary efferent conduit(s) 29 if open, or if closed will stop flow only to the efferent conduit to the toilet 27 and auxiliary efferent conduit(s) 29. Check valves 37 are variously disposed along various conduits within the current device to prevent backflow.

Also, as shown in FIG. 1, Flow detector on efferent conduit to toilet 33 functions through logic circuit 10 to close hot water conduit valve 31, and optionally cold water conduit valve 32, if abnormal or prolonged flow is noted through efferent conduit to toilet 27. Afferent hot water conduit temperature sensor 34, afferent cold water temperature sensor 35 and efferent conduit temperature sensor 36, working through logic circuit 10, may be variously employed to return the current device to default status with hot water conduit valve 31 closed and cold water conduit valve 32 open if improper warm or hot water is detected within the system.

5. External Connectors

In the illustrative embodiment, solder-less or other appropriately variable connectors are used for the integration of the current device into the plumbing network.

To ease plumbing concerns, solder-less or otherwise acceptable connection fixtures are made available for afferent hot water, afferent cold water, efferent hot water to bathtub/shower, efferent cold water to bathtub/shower, efferent hot water to sink, efferent cold water to sink and efferent water to toilet.

The types of connectors as well as numbers of plumbing components to be serviced, along with their positioning may be highly variable. Also, if the current device is not contained within external housing 50, but is instead disposed with its components remotely located one from another as in a large public bathroom such as a highway rest stop or an old home renovation, the function is roughly the same, but the connections may be varied.

6. External Housing

In the illustrative embodiment and depending upon position and application, an external housing 50 encloses most if not all of the components of the current device. It allows for ease of integration into a plumbing network and eliminates most, if not all, improvisation required on the part of the installer.

In the illustrative embodiment, the current device is a self-contained plumbing component within external housing 50. Electrical hookup for AC power to unit 51 would be attached to and without or within the external housing 50. The electrical connector for any remote control switch or sensor 52, such as that from an automatic toilet commonly found in public restrooms would also likely be attached to, or found without or within, external housing 50. A control switch 53, instant on button 54, hot/warm indicator light 55, and toilet leak detector indicator light 56 would, in the illustrative embodiment, be located on a faceplate of the external housing 50, which would then be visible to the consumer. Accommodation for afferent water conduits and connectors as well as accommodation for efferent water conduit and connectors would also be conveniently disposed for efficient plumbing purposes.

Although usually dimensioned it to fit within the typical wall cavity, the external housing 50 may or may not contain or accommodate any or all of the variable components of the current device depending upon specific application of the current device and location(s) of water supply lines and plumbing components to be serviced.

7. Connections of Main Elements and Sub-Elements of Device

In the illustrative embodiments, the logic circuit 10 and all sub-elements are connected to the various flow control components via signal wire, circuitry and/or wireless connectivity. The tubing/piping components and all sub-elements are connected to one another via variably building code-correct generally solder-less connectors. Similarly, the external connectors are connected via similar solder-less or other connectors, which are then fastened to the external housing 50 along with all other electrical components visible to the consumer.

8. Alternative Embodiments of the Hot Water Expediter Device

The current device does not necessarily require the presence of every component described herein or those described below. Described above are multiple redundant systems in order to guarantee expedited delivery of hot water and guard against hot water overuse, water waste, and malfunction of components both within and without the current device.

Another embodiment includes integration of the current device into a scrub sink. There is perhaps no more pressing requirement for mandatory hygienic hand cleansing than in the operative setting. Hygienic temperature for appropriate hand and forearm preoperative scrubbing requires water temperatures of at least 100° F. If operating room personnel do not have appropriately warmed water for comfortable and effective hygienic preoperative prepping, they must open the mixing valve and let water run down the drain until water of an appropriate comfortable temperature is detected. If the scrub sink or, bank of sinks, is/are not in constant use, water stands in the conduits servicing the device until there is demand for water of hygienic temperatures. The water in both the hot and cold water conduits will revert to the ambient temperature within the building. Depending upon the distance between the scrub sink and the hot water source, a significant amount of time is wasted while waiting for conditions to be right for proper hygienic scrub activities. Time is money within the realm of operating room activities and of the essence in emergency surgery situations. The top priority with any surgical prep is minimizing potential for spread of infectious disease as well as postoperative wound infections.

Figure 6:
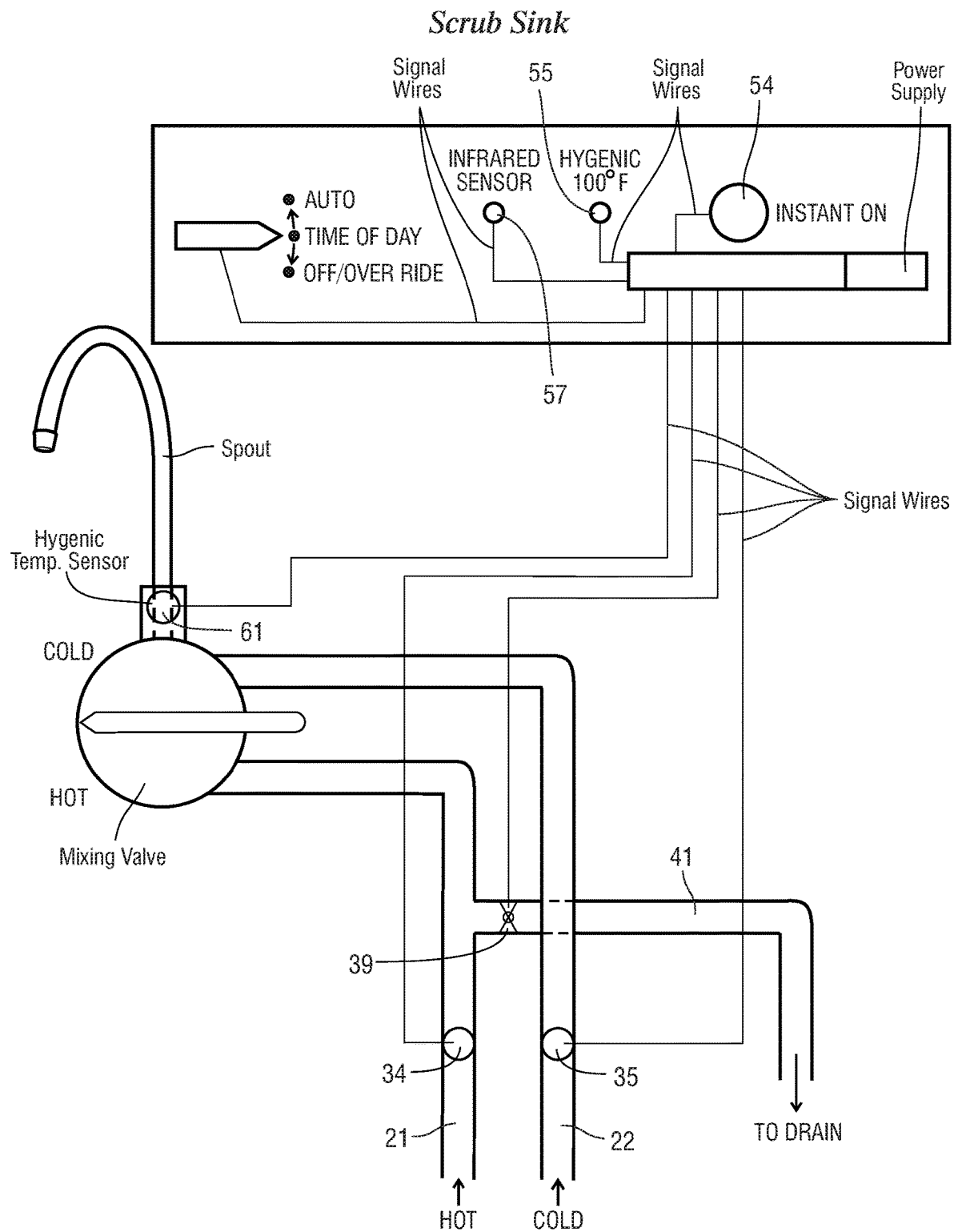
FIG. 6 is a schematic diagram of a scrub sink water distribution system using yet another version of the automatic hygienic hot water expediter device, according to yet another illustrative embodiment of the invention.

The scrub sink embodiment, which is illustrated in FIG. 6, may either be integral to and within each individual sink, or separate from certain sinks and serving multiple fixtures in the same general location of the surgical suite. Each scrub sink would likely be fitted with an indicator light 55 and hygienic temperature sensor 61 noting the presence or availability of hot water.

In this illustrative embodiment, switching options for the hot water expediter device may include "off" or "override", "time of day", "automatic", and "instant on".

With the system selector switch in the "off" or "override" position, the expediter valve 39 is default closed. Water flow is not influenced in any way by the current device.

With the system selector switch in "time of day" mode, the temperature differential within the afferent hot water conduit 21 and afferent cold water conduit 22 is constantly analyzed via afferent hot water conduit temperature sensor 34 and afferent cold water conduit temperature sensor 35 and the expediter valve 39 is opened or closed as necessary in order to maintain hot water at the scrub sink. If there is no significant temperature differential detected between the afferent hot water conduit temperature sensor 34 and afferent cold water conduit temperature sensor 35, the expediter valve 39 is opened allowing water to flow through the expediter conduit to drain 41 until there is immediate availability of hot water on demand for surgical teams preparing for procedures. Once the temperature differential is 20 to 30° F., the expediter valve 39 returns to its default closed configuration. No water is dispensed into the scrub sink until the mixing valve to the spout is opened. "Time of day" mode would generally be selected during normal operating room hours during the work week.

"Automatic" mode allows for the detection of a member of the surgical team in front of the sink via infrared sensor 57, which then triggers the opening of the expediter valve 39 shunting water through the expediter conduit to drain 41, as necessary, until a significant temperature differential of 20 to 30° F. is detected between the afferent hot water conduit temperature sensor 34 and afferent cold water conduit temperature sensor 35. Once there is a significant temperature differential detected, the expediter valve 39 closes. Meanwhile, no water is flowing through this spout into the scrub sink until the mixing valve is opened.

"Instant on" mode requires the operator to push the instant on button 54 (see FIG. 6), which then summons hot water in similar fashion as described above with the expediter valve 39 open, thereby shunting water through the expediter conduit to drain 41 until an appropriate temperature differential of 20 to 30° F. is detected. For instance, one might push the instant on button 54 while passing by the sink on the way to pick up operating room supplies, on the way into the operating room to check the status of the patient or monitor readiness for a procedure, while transporting the patient on a gurney, or while obtaining a surgical scrub brush. "Instant on" mode might be employed in situations where multiple scrub sinks are positioned in non-linear fashion or in a confined hallway or other area where there is foot traffic not necessarily on the part of members of the scrub personnel.

Depending upon the design characteristics of an older scrub sink, retrofit possibilities may also exist.

Figure 5:
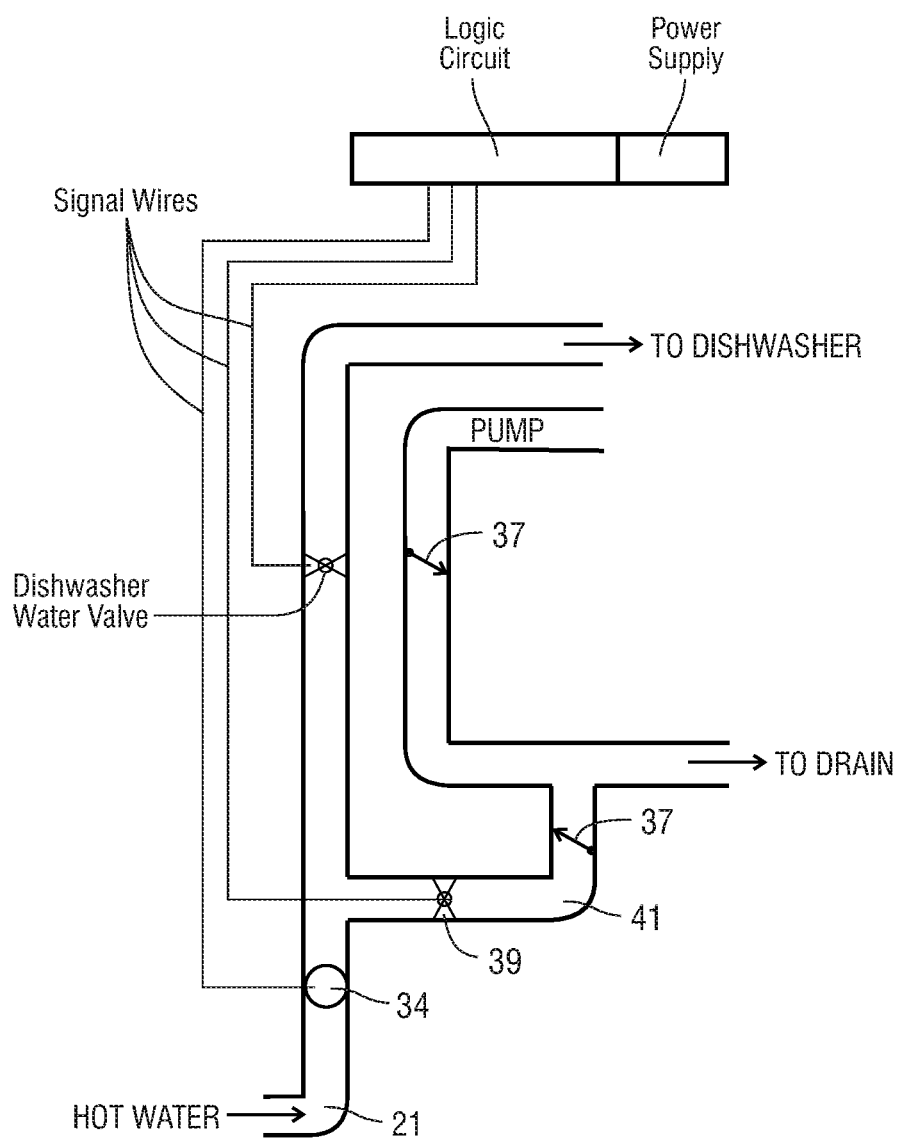
FIG. 5 is a schematic diagram of a dishwasher water distribution system using still another version of the automatic hygienic hot water expediter device, according to still another illustrative embodiment of the invention.

Yet another embodiment would be incorporated into an automatic dishwasher as illustrated in FIG. 5. In order for complete cleaning of dishes and utensils within a modern dishwasher, it is generally required to have water temperatures of at least 120° F. The pre-wash cycle is intended to remove as much grease, oil and debris from the items to be washed as possible. This allows for more complete cleansing. It is suggested (within the typical instruction booklet associated with many dishwashers) the hot water spigot to the adjacent kitchen sink be opened until hot water emerges prior to activation of the dishwasher. And yet, often the consumer will simply load the dishwasher and insert a soap packet, activate the appliance, and walk away without first summoning water of appropriate temperature. This does not allow for optimal cleaning, particularly if the items have not been well rinsed of debris and/or degreased in advance of the wash cycle and there is no pre-heating of water within the appliance.

The dishwasher embodiment functions in the following manner. Afferent hot water conduit temperature sensor 34 measures absolute temperature (see FIG. 5). When the dishwasher is first activated, the afferent hot water conduit temperature sensor 34 will possibly detect ambient temperature water within the afferent hot water conduit 21 due to disuse. If this is the case, the water valve to the dishwasher, which is in the default closed position, will remain so and the expediter valve 39, which is in the default closed position, will open and ambient temperature water from afferent hot water conduit 21 then will be redirected through the expediter conduit to drain 41 until hot water temperature of at least 120° F. is detected at afferent hot water conduit temperature 34, at which time, the expediter valve 39 closes and the water valve to the dishwasher opens to begin the cycle.

Figure 7:
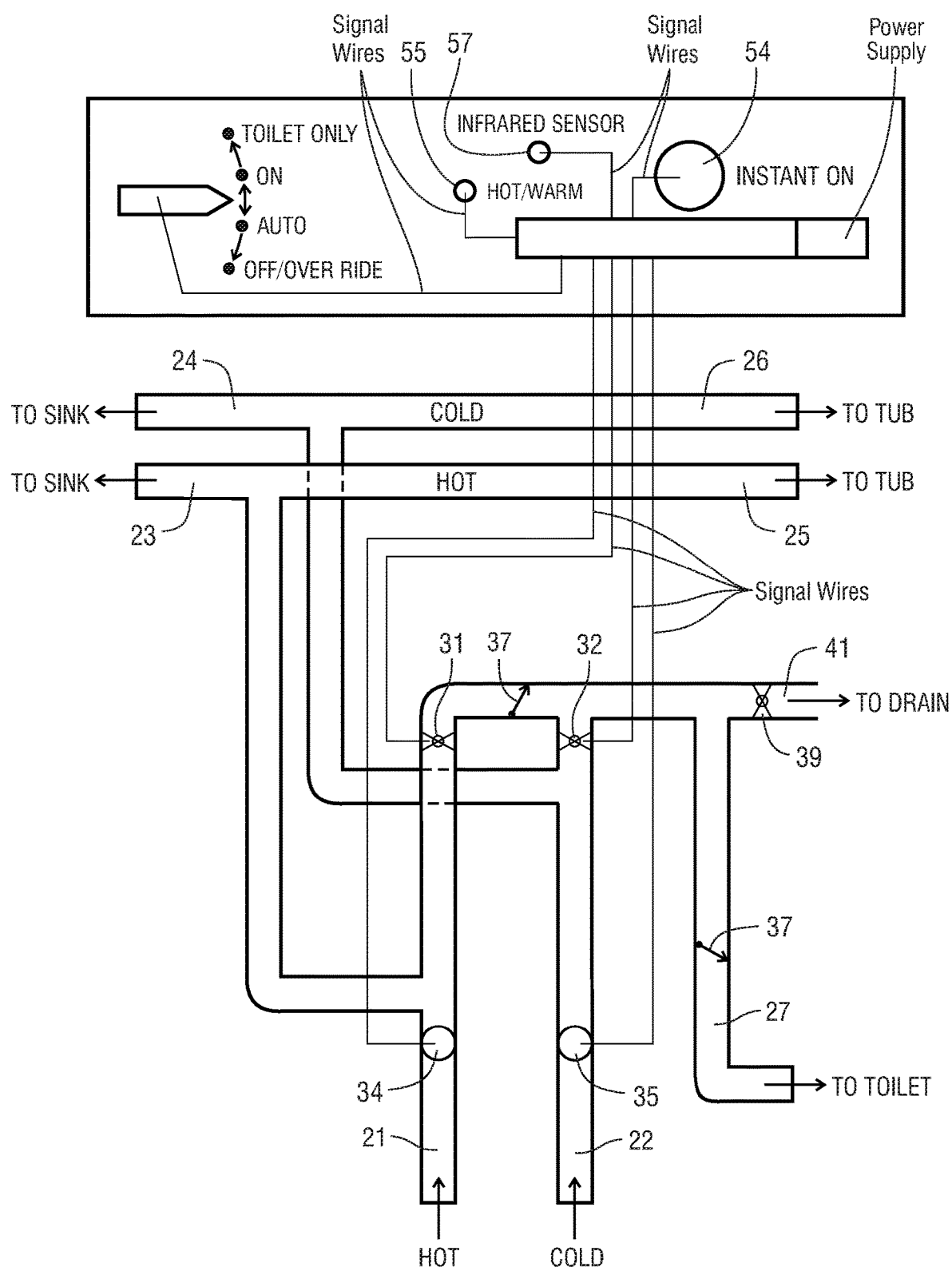
FIG. 7 is a schematic diagram of a residential/small restaurant water distribution system using still another version of the automatic hygienic hot water expediter device, according to still another illustrative embodiment of the invention.

Yet another embodiment illustrated in FIG. 7 is the basic residential and small restaurant embodiment. System switching options would include, but not be limited to, "off" or "override", "time of day", "automatic", "toilet only", and "instant on".

Referring to FIG. 7, with the system selector switch in the "off" or "override" position, the hot water conduit valve 31 is in the default closed position, the cold water conduit valve 32 is in default open position, and the expediter valve 39 to the expediter conduit to drain 41 is in default closed position. Water flow within the bathroom is unaffected by the device.

With the system selector switch in the "time of day" mode, the device is variably switched on or off depending upon timer settings. While on, the afferent hot water conduit temperature sensor 34 and the afferent cold water conduit temperature 35 differential is constantly analyzed and hot water is constantly maintained at the bathroom spigot by alternately opening and closing the expediter valve 39 controlling flow within the expediter conduit to drain 41. The amount of water going down the drain would be minimized by downstream cold water consumption by the toilet, urinal, or any other plumbing fixture requiring cold water serviced by the current device.

"Automatic" mode allows for the detection of the consumer within the bathroom through infrared sensor 57. Depending upon the temperature differential detected between the afferent hot water conduit temperature sensor 34 and afferent cold water conduit temperature sensor 35, hot water would be summoned to, and maintained within, the vicinity of the sink spigot through efferent movement of water, for instance, as the result of toilet usage or shunting down the drain. This would be accomplished by closing the cold water conduit valve 32 and opening the hot water conduit valve 31 while simultaneously opening the expediter valve 39 to expediter conduit to drain 41. Once the desired temperature differential of 20 to 30° F. is detected, the valves return to their default positions. Flow through expediter valve 39 would be minimized by flushing the toilet, which would result in the movement of water through the efferent conduit to toilet 27. This mode might be employed when bathroom traffic is unpredictable such as on a weekend or during vacation/holiday times.

"Toilet only" mode allows only for the summoning of hot water as the result of efferent filling of the toilet tank. The consumer is detected within the bathroom through infrared sensor 57 and if the temperature differential in the afferent hot water conduit 21 and afferent cold water conduit 22 is inadequate, the hot water conduit valve 31 opens and the cold water conduit valve 32 closes allowing shunting of ambient temperature water through the afferent hot water conduit 31 to be repurposed through the efferent conduit to toilet 27 to fill the toilet tank. Once the temperature differential reaches 20 to 30° F., the hot water conduit valve 31 closes and the cold water conduit valve 32 re-opens. In this mode, expediter valve 39 is maintained in closed configuration. This mode of operation might primarily be utilized in the morning or during the night.

"Instant on" mode requires the consumer to depress instant on button 54 or be detected by infrared sensor 57. Once the current device is actuated, if the hot and cold water conduit temperature differential is inadequate, immediate summoning of hot water is accomplished either through the opening of expediter valve 39, thereby shunting ambient temperature water through the expediter conduit to drain 41, or if there is concomitant use of the commode, filling of the toilet tank through the efferent conduit to toilet 27. This mode might be chosen at irregular times during the day.

The embodiment of FIG. 7 would efficiently service multiple restrooms in the same locale, such as men's, women's, and family facilities. A variation of this embodiment would eliminate expediter valve 39 and expediter conduit to drain 41, thus servicing only the toilet(s).

Yet another embodiment includes addition of, for example, a normally open solenoid valve 38 on the efferent conduit to toilet 27 along with appropriate sub-circuit within logic circuit 10 to shut down flow to the toilet or other plumbing fixture if a leak is detected.

Yet another embodiment would connect a flow detector on the efferent conduit to toilet 27 through an appropriate sub-circuit of logic circuit 10 to a toilet fill indicator light mounted, for example, on the external housing 50.

Yet another embodiment would include making the sink and/or tub/shower faucet integral to the current device with, for instance, hot/warm indicator light 55 attached to, and/or a part of, the hot water spigot.

Yet another embodiment would provide for a separate conduit branching from the efferent conduit to toilet 27 to service urinals or other fixtures.

Yet another embodiment would provide for the placement of sensors in multiple adjacent bathrooms allowing for one current device to simultaneously service multiple restrooms and/or rooms requiring hot and/or cold water.

Yet another embodiment includes the addition of flow and temperature detectors at any and all levels of the internal tubing/piping, which would allow for more comprehensive monitoring of all plumbing fixtures, especially for leaks. In conjunction with valves blocking afferent water to the device, this would allow for shut down of the fixtures until the system has been analyzed and repairs accomplished.

Figure 4:
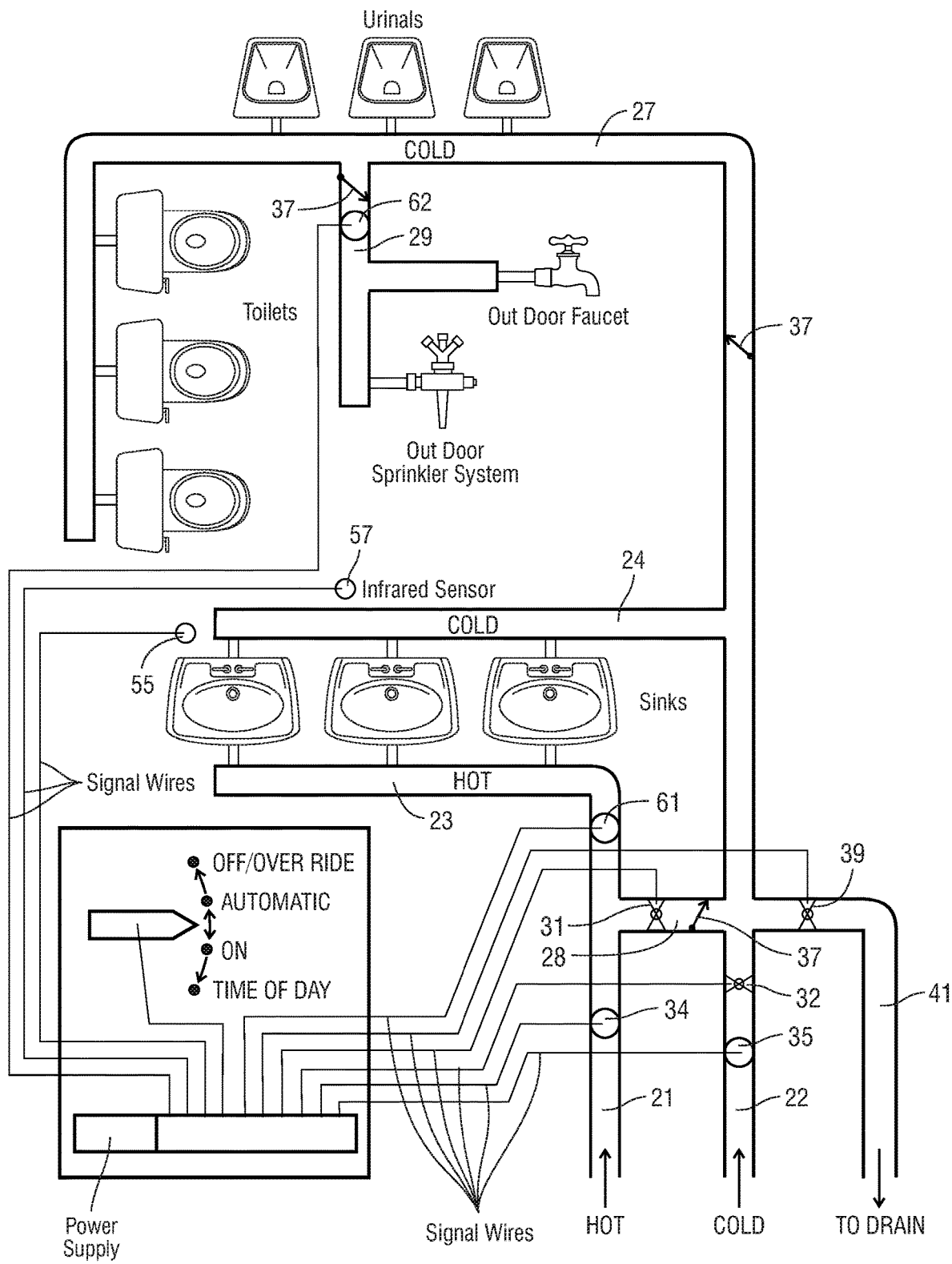
FIG. 4 is a schematic diagram of a restroom water distribution system using yet another version of the automatic hygienic hot water expediter device, according to yet another illustrative embodiment of the invention.

Yet another embodiment as illustrated in FIG. 4 features its suitability for highway rest stop/stadium/convention center/performance center/school applications. As illustrated, system switching options include "off" or "override", "on", whereby hot water is maintained at all times at sink faucet(s), "auto or automatic", during which the presence of consumer(s) is noted via infrared sensor 57 which then activates the system to provide hygienic hot water at a faucet via any necessary means, and "time of day" mode, which is an option for more efficient switching between other modes of operation to more closely match hot water demand.

With the system selector switch in the "off" or "override" position, the afferent hot water valve 31 is in default closed configuration, the afferent cold water valve 32 is in default open configuration, and the expediter valve 39 is in default closed position. There is no restriction to any fixture serviced by this portion of the plumbing system.

When the system selector switch is in either the "on" or "automatic" position, the logic circuit analyzes the differential temperature between the afferent hot water conduit 21 and afferent cold water conduit 22 via the afferent hot water conduit temperature sensor 34 and the afferent cold water conduit temperature sensor 35.

With the system selector switch in the "on" position, and there is a significant detected temperature differential of 20 to 30° F., the hot water conduit valve 31 is in default closed configuration and the cold water conduit valve 32 is in default open configuration. The expediter valve 39 is in default closed configuration. Water flows through the system in normal fashion and no water flows through the hot water expediter conduit 28. If there is no significant temperature differential detected, the expediter valve 39 to the drain is open. The expediter valve 39 to the expediter conduit to drain 41 remains open until there is a significant temperature differential of 20 to 30° F. measured between the afferent hot water conduit 21 and afferent cold water conduit 22. The amount of time the expediter valve 39 remains open is variable depending upon the measured temperature differential, which is significantly influenced by cold water demand in the efferent cold water conduit to sink 24 and efferent cold water conduit to toilet 27 which in this application is also servicing urinals as well as the auxiliary efferent cold water conduit 29, which may service, for example, an outdoor sprinkling system, outdoor faucet, and/or any other cold water consuming plumbing fixture connected to, and downstream from, the current device. Optionally, if flow is detected in the auxiliary efferent cold water conduit 29 as detected by the flow detector within auxiliary efferent conduit 62 or an outdoor sprinkler system, the expediter valve 39 may be forced to remain in the default closed position. The system continues to maintain hygienic hot water at the faucets by any means necessary. The "on" mode would likely be employed during typically busy portions of the day.

With the system selector switch in the "automatic" position and in the presence of a significant temperature differential of 20 to 30° F. detected between the afferent hot water conduit 21 and afferent cold water conduit 22, the hot water conduit valve 31 is in default closed position, the cold water conduit valve 32 is in default open position, and the expediter valve 39 is in default closed position. The system remains in the default mode of operation until a consumer is detected via infrared sensor 57. Once a consumer is detected, and if there is no significant temperature differential between the afferent hot water conduit 21 and the afferent cold water conduit 22, the cold water conduit valve 32 would be closed and the hot water conduit valve 31 would open and the expediter valve 39 would also open. This configuration of valves would be maintained until the temperature differential between the sensors became significant in the range of 20 to 30° F. and then all valves would return to their default positions. The "automatic" mode would likely be employed during the night or at times when consumer traffic in and out of the rest stop or other variably trafficked public rest facility would be sparse. It also happens this would likely be the time of day when an outdoor sprinkler system might be operational, which would, possibly with the aid of the flow detector within auxiliary efferent conduit 62, automatically maintain hot water at the faucet and minimize water passing through the expediter valve 39.

Regardless of mode of operation, once the hygienic temperature sensor 61 measures water of 100° F. within efferent hot water conduit to sink 23, hot/warm water indicator light 55 signals the consumer as to the presence of appropriate conditions for hygienic hand washing.

The "time of day" mode would be employed in order to closely match consumer related demand.

Yet another embodiment allows for placement and/or disposition of any components of the current device outside of external housing 50 as necessary in order to accomplish the intended purpose of the invention. This would be particularly useful in renovations or larger public projects.

Figure 8:
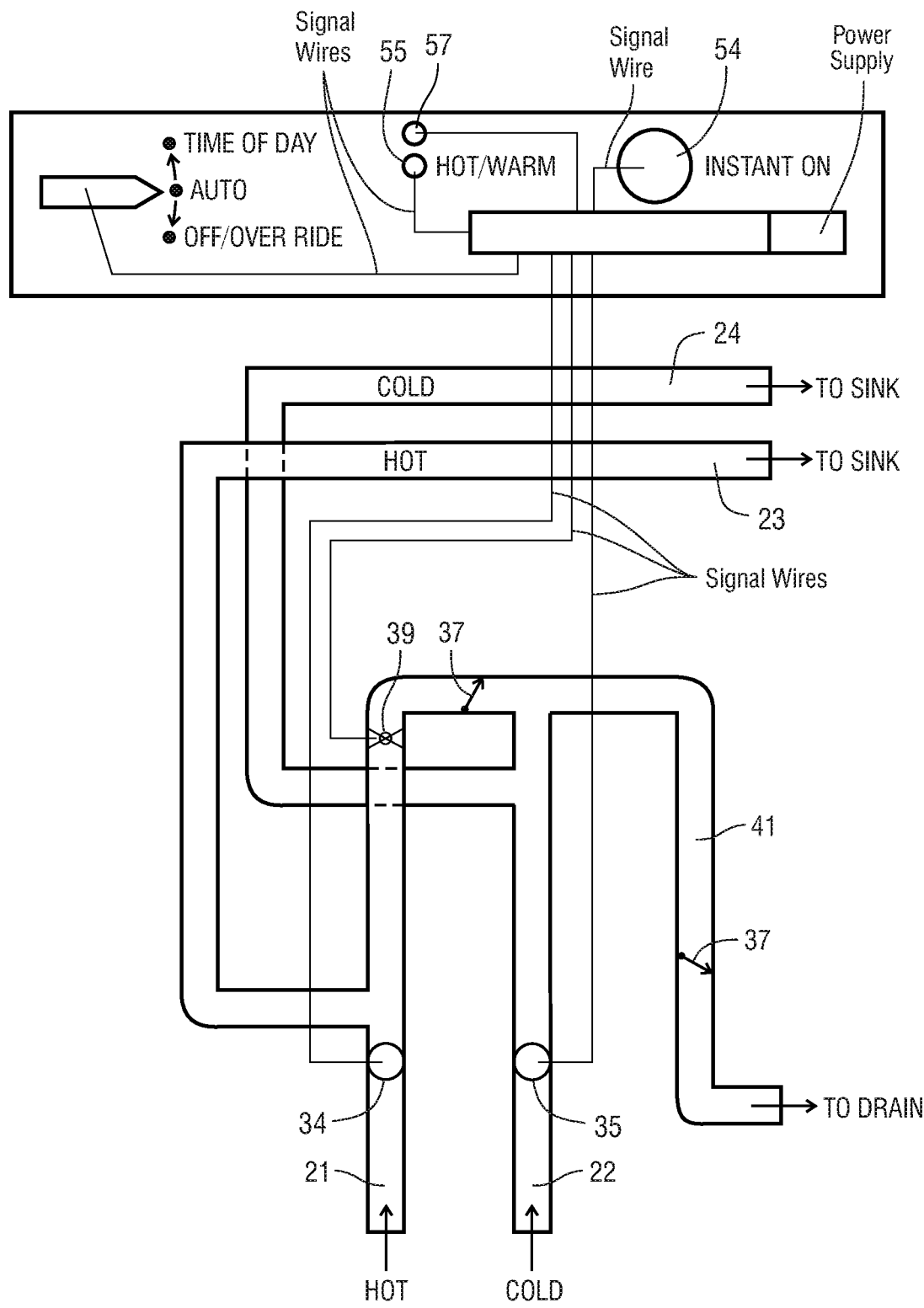
FIG. 8 is a schematic diagram of a surface-mounted under-sink water distribution system using yet another version of the automatic hygienic hot water expediter device, according to yet another illustrative embodiment of the invention.

Yet another surface-mounted under-sink embodiment is illustrated in FIG. 8. This embodiment would likely be retrofitted into, for instance, existing residential half baths and restaurant bathrooms that are not under renovation.

In the embodiment of FIG. 8, system switching options may include "off" or "override", "time of day", "automatic" and "instant on".

With the system selector switch in the "off" or "override" position, the expediter valve 39 is default closed. Water flow is not influenced in any way by the current device.

With the system selector switch in "time of day" mode, the temperature differential within the afferent hot water conduit 21 and afferent cold water conduit 22 is constantly analyzed by afferent hot water conduit temperature sensor 34 and afferent cold water conduit temperature sensor 35 and the expediter valve 39 is opened or closed as necessary in order to maintain hot water at the sink. If there is no significant temperature differential detected between the afferent hot water conduit temperature sensor 34 and the afferent cold water conduit temperature sensor 35, the expediter valve 39 is opened allowing water to flow through the expediter conduit to drain 41 until there is immediate availability of hot water on demand. Once the temperature differential is 20 to 30° F., the expediter valve 39 returns to its default closed configuration. Water of appropriate hygienic temperatures is then available via efferent hot water conduit to sink 23 to be mixed with water from efferent cold water conduit to sink 24. "Time of day" mode would likely be selected during periods of routine or heavy warm or hot water demand. The availability of warm water at the sink may be indicated by hot/warm water indicator light 55.

"Automatic" mode allows for the detection of a consumer in front of the sink via infrared sensor 57, which then triggers opening of the expediter valve 39 shunting water through the expediter conduit to drain 41, as necessary, until a significant temperature differential of 20 to 30° F. is detected between the afferent hot water conduit temperature sensor 34 and the afferent cold water conduit temperature sensor 35. Once there is a significant temperature differential detected, the expediter valve 39 closes. Again, hot/warm water indicator light 55 would signal the immediate availability of water of hygienic temperatures.

"Instant on" mode requires the operator to push the instant on button 54 which then summons hot water in similar fashion as described above with the expediter valve 39 open thereby shunting water through the expediter conduit to drain 41 until an appropriate temperature differential of 20 to 30° F. is detected. Hot/warm water indicator light 55 would then be activated. "Instant on" mode might be employed during times in which hot water demand is sporadic.

Yet another embodiment provides for the analysis and measurement of the absolute temperatures of the water within the hot and cold afferent conduits as well as the ambient temperature within the building while being considered by logic circuit in order for optimal control the hot and cold conduit valves.

Yet another embodiment provides for wireless connectivity between any and all components as necessary.

Yet another embodiment provides for separate auxiliary efferent conduits 29 from the region of the efferent conduit to toilet 27, in the illustrative embodiment or otherwise, which would service a separate device, spigot or other plumbing fixture, particularly in a situation where there are multiple bathrooms or bathroom and kitchen combinations serviced by a single current device mechanism such as in a small restaurant, which would allow for constant maintenance of warm water in close proximity to the common hot water spigots.

The sizes/lengths/diameters/dimensions of the individual components can vary depending upon application and, for instance, if certain of the various components are contained within the external housing 50, or disposed to varying locations as convenient or required by the application at hand, which represents yet another embodiment.

9. Operation of Illustrative Embodiments

In a typical scenario in the absence of the current device, the consumer arises in the morning, for instance, and heads to the bathroom to use the commode. The toilet is flushed. Sometimes the toilet is flushed multiple times. As soon as the toilet is flushed, the toilet tank float drops as the flap opens and cold water begins to enter the tank, even before it is has emptied, in order to wash waste down the drain. Once the water level and float drop to a certain level near the bottom of the tank, the flap closes thus sealing against water outflow thereby allowing refill for the next flushing cycle. If the toilet is flushed sequentially before the tank is completely refilled, there is continuous flow of water into the tank. Ultimately, hygienic hand washing should then follow which requires warm water. Standing within the hot water line to the sink is ambient temperature water. Therefore, either the consumer runs water down the drain while waiting for warm water to emerge from the spigot, or hand washing is carried out in less than hygienic fashion. Or, alternately, the consumer begins the day with a very cold splash in the face.

The minimum recommended water temperature for hygienic hand washing is 100° F. This far exceeds the ambient temperature of a typical building.

In the absence of the current device, the consumer must actively monitor the flow of water for an acceptably warmer temperature by placing his or her hand in the outflow stream. This occurs while simultaneously wasting a volume of water which can easily exceed one half gallon. Perhaps the consumer is in a hurry to return to a task and does not wait for the proper temperature water, or does not wash at all due to discomfort caused by unacceptably cold and uncomfortable water flow. This might be the case in a restaurant or highway rest stop scenario. Particularly in the case of a restaurant, this can lead to the spread of infectious disease.

However, with the current device in its illustrative embodiments and in automatic mode, the consumer enters the bathroom often after a period of plumbing inactivity (for instance overnight) and is automatically detected electronically. This energizes the current device, which then begins monitoring the temperature within its afferent hot and cold water lines. Due to the design of the current device, this represents all water entering the bathroom because through it, the bathroom is plumbed. The toilet is flushed and the water temperatures within the hot and cold afferent water lines are monitored electronically for a significant differential. Whilst the temperatures in each line are approximately equal (to the ambient temperature of the building), the normally closed valve in the hot water line is automatically opened and the normally open valve in the cold water line is automatically closed. This allows the ambient temperature water within the hot water line to be disposed of within the actively filling toilet tank. When the temperature in the afferent hot water conduit rises to a significant differential of 20 to 30° F. as compared to the afferent cold water line, the valve on the hot water line returns to its default closed position and the valve on the cold water line returns to its default open position. This allows the toilet tank to complete its filling cycle with cold water while automatically making warm water immediately available at the spigot of choice. An indicator light associated with the current device for the relative proximity of warm water may be employed alerting the consumer as to its availability. Delivery of the hot water to the spigot of choice is thus accomplished without the need for any secondary or in-line heating source and instead relies upon the main hot water system of the building such as a conventional hot water heater.

Operation of the device is unaffected by hot water usage within the building, but outside of the portion of the plumbing system controlled by the current device, since functionality is unimpeded by variable pressure within the general hot water system due to consumption by other remote fixtures and/or devices.

As long as hot water is available within the afferent line, the valves within the current device remain in their default positions allowing for otherwise normal flow of water within the bathroom and its fixtures. In the case of a power failure, the flow within the bathroom is unaffected and remains in the default mode.

It is readily apparent that the aforedescribed hot water expediter device offers numerous advantages and benefits. First, the device expedites the delivery of water of hygienic temperatures to the spigot or fixture of choice, from the central hot water heating system of the building or facility, while monitoring and prioritizing water temperatures for reasons of public health, and simultaneously minimizing waste and/or redirecting water that would otherwise be sent down a drain. Secondly, the device repurposes water instead of wasting as a first priority as the device functions to maintain water of appropriate hygienic temperatures in the vicinity of the fixture of choice. Finally, the device redirects water down the drain as necessary in order to provide appropriate hygienic conditions to minimize chances for the spread of infectious disease and also to provide comfort to the consumer.

Advantageously, the hot water expediter device also has the following additional benefits:

1. Is passive, automatic and operates electronically while requiring a power supply.
2. Requires no touching or manipulation of a fomite such as a lever, valve, or chain in order to operate.
3. Requires no attention on the part of the consumer.
4. Compensates automatically for any plumbing activity occurring in the same bathroom or elsewhere within the building.
5. Requires no extraneous storage tank, plumbing conduit, valves, or other fixtures not already found in a typical plumbing system, in order to function.
6. Is a self-contained standalone plumbing fixture through which an entire typical bathroom(s) and adjacent room(s) where there is additional water usage (such as a kitchen), may be easily plumbed without requiring any significant improvisation on the part of the installer.
7. Is designed to expedite the delivery of warm hygienic water to the consumer with the secondary benefit of water redirection, repurposing, improved hygiene, minimization of the spread of infectious disease, and conservation.
8. May be programmed for time of day functionality.
9. Indicates hygienic hot water availability at fixture of choice.
10. Provides leak monitoring capabilities with system shutdown as indicated.
11. Overcomes problematic co-mingling of hot and cold water within plumbing lines.
12. No plumbing return line required.
13. Does not require 220 V service.

Index of Illustrated Elements:
10: Logic Circuit
Internal Tubing/Piping
21: Afferent hot water conduit
22: Afferent cold water conduit
23: Efferent hot water conduit to sink
24: Efferent cold water conduit to sink
25: Efferent hot water conduit to bathtub/shower
26: Efferent cold water conduit to bathtub/shower
27: Efferent conduit to toilet
28: Hot water expediter conduit
29: Auxiliary efferent conduit
41: Expediter conduit to drain
Flow Control Components
31: Hot water conduit valve
32: Cold water conduit valve
33: Flow detector on efferent conduit to toilet
34: Afferent hot water conduit temperature sensor
35: Afferent cold water conduit temperature sensor
36: Efferent toilet conduit temperature sensor
37: Check Valve
38: Efferent toilet conduit valve
39: Expediter Valve
61: Hygienic temperature sensor
62: Flow detector on auxiliary efferent conduit
50: External Housing
51: Electrical hook-up for AC power to the unit
52: Electrical connector for remote control switch or sensor
53: Control switch
54: Instant on button
55: Hot/warm water indicator light
56: Toilet leak detector indicator light
57: Infrared sensor
59: Mounting flange What has been described and illustrated herein is an illustrative embodiment of the current invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting affect.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. An automatic hygienic hot water expediter device, the device comprising:
an afferent hot water conduit comprising an afferent hot water conduit temperature sensor disposed therein, the afferent hot water conduit temperature sensor configured to sense a temperature of hot water in the afferent hot water conduit;
an afferent cold water conduit comprising an afferent cold water conduit temperature sensor disposed therein, the afferent cold water conduit temperature sensor configured to sense a temperature of cold water in the afferent cold water conduit;
an efferent hot water conduit fluidly coupled to the afferent hot water conduit, the efferent hot water conduit configured to supply hot water to one or more plumbing fixtures;
a first efferent cold water conduit fluidly coupled to the afferent cold water conduit, the first efferent cold water conduit configured to supply cold water to the one or more plumbing fixtures;
a second efferent cold water conduit fluidly coupled to the afferent cold water conduit, the second efferent cold water conduit configured to supply cold water to one or more other plumbing fixtures or a drain line;
a hot water expediter conduit fluidly coupling the afferent hot water conduit to the afferent cold water conduit, the hot water expediter conduit connected to the afferent hot water conduit at a first location downstream of the efferent hot water conduit, the hot water expediter conduit connected to the afferent cold water conduit at a second location downstream of the first efferent cold water conduit, the hot water expediter conduit extending from the first location to the second location;
a hot water control valve disposed in the hot water expediter conduit, the hot water control valve configured to regulate flow through the hot water expediter conduit;
a cold water control valve disposed in the afferent cold water conduit downstream of the first efferent cold water conduit and upstream of the second efferent cold water conduit, the cold water control valve further being upstream of the second location where the hot water expediter conduit is connected to the afferent cold water conduit, the cold water control valve configured to regulate a flow of cold water into the second efferent cold water conduit; and
a controller operatively coupled to the afferent hot water conduit temperature sensor, the afferent cold water conduit temperature sensor, the hot water control valve, and the cold water control valve, the controller being programmed to operate in at least a first control mode;
wherein, when operating in the first control mode, and upon the controller receiving sensor output data from the afferent hot water conduit temperature sensor and the afferent cold water conduit temperature sensor indicating that the hot water temperature in the afferent hot water conduit is less than, or substantially equal to the cold water temperature in the afferent cold water conduit, the controller is configured to open the hot water control valve and close the cold water control valve so that water from the hot water expediter conduit flows into the second efferent cold water conduit; and wherein, when operating in the first control mode, and upon the controller receiving sensor output data from the afferent hot water conduit temperature sensor and the afferent cold water conduit temperature sensor indicating that the hot water temperature in the afferent hot water conduit is greater than the cold water temperature in the afferent cold water conduit, the controller is configured to close the hot water control valve and open the cold water control valve so that water from the afferent cold water conduit flows into the second efferent cold water conduit, rather than the water from the hot water expediter conduit flowing into the second efferent cold water conduit.

2. The device according to claim 1, further comprising a first check valve disposed in the hot water expediter conduit, the first check valve configured to restrict water flow to a single flow direction from the afferent hot water conduit to the afferent cold water conduit.

3. The device according to claim 2, further comprising a second check valve disposed in the second efferent cold water conduit, the second check valve configured to restrict water flow to a single flow direction from the afferent cold water conduit or the hot water expediter conduit to the second efferent cold water conduit.

4. The device according to claim 1, wherein the one or more plumbing fixtures supplied by the efferent hot water conduit and the first efferent cold water conduit are selected from the group consisting of: (i) a sink, (ii) a bathtub, and (iii) shower, and (iv) combinations thereof.

5. The device according to claim 1, wherein the one or more other plumbing fixtures supplied by the second efferent cold water conduit include a toilet.

6. The device according to claim 1, wherein the controller, the afferent hot water conduit temperature sensor, the afferent cold water conduit temperature sensor, the hot water control valve, and the cold water control valve are disposed inside a housing.

7. The device according to claim 6, wherein the housing comprises at least one mounting flange disposed on a side of the housing, and the housing is in a form of a self-contained unit configured to fit within a wall cavity.

8. The device according to claim 6, wherein a periphery of the housing comprises one or more piping connectors for respective ones of the afferent hot water conduit, the afferent cold water conduit, the efferent hot water conduit, the first efferent cold water conduit, and/or the second efferent cold water conduit.

9. The device according to claim 1, further comprising a hot/warm water indicator light operatively coupled to the controller, the hot/warm water indicator light configured to indicate an availability of hygienically warm water in the afferent hot water conduit.

10. The device according to claim 1, further comprising a selector switch and a person detection sensor operatively coupled to the controller of the device, the person detection sensor configured to sense a presence of a user in front of the person detection sensor, and the selector switch having a first "on" position, a second "auto" position, and a third "override" position;

wherein, in the first "on" position, the controller is configured to continually maintain a temperature differential between the afferent hot water conduit and the afferent cold water conduit by selectively opening and closing the hot water control valve and the cold water control valve based on the sensor output data from the afferent hot water conduit temperature sensor and the afferent cold water conduit temperature sensor;

wherein, in the second "auto" position, when the presence of the user is sensed by the person detection sensor, the controller is configured to maintain a temperature differential between the afferent hot water conduit and the afferent cold water conduit by selectively opening and closing the hot water control valve and the cold water control valve based on the sensor output data from the afferent hot water conduit temperature sensor and the afferent cold water conduit temperature sensor; and wherein, in the third "override" position, the controller is configured to maintain the hot water control valve in a closed position and the cold water control valve is in an open position.

11. The device according to claim 1, further comprising an "instant on" button operatively coupled to the controller of the device;

wherein, when the "instant on" button is pushed by a user, if a temperature differential between the afferent hot water conduit and the afferent cold water conduit is below a predetermined temperature differential, the controller is configured to increase the temperature differential between the afferent hot water conduit and the afferent cold water conduit by opening the hot water control valve and closing the cold water control valve, and maintaining an open position of the hot water control valve and a closed position of the cold water control valve until the predetermined temperature differential is reached.

12. The device according to claim 5, further comprising a toilet leak indicator light and a flow detector operatively coupled to the controller of the device, the flow detector configured to detect abnormal or prolonged water flow through the second efferent cold water conduit to the toilet, and the controller being configured to illuminate the toilet leak indicator light when the abnormal or prolonged water flow is detected by the flow detector.

* * * * *